US012111933B2

United States Patent
Bishop, III et al.

(10) Patent No.: US 12,111,933 B2
(45) Date of Patent: Oct. 8, 2024

(54) SYSTEM AND METHOD FOR DYNAMICALLY UPDATING EXISTING THREAT MODELS BASED ON NEWLY IDENTIFIED ACTIVE THREATS

(71) Applicant: BANK OF AMERICA CORPORATION, Charlotte, NC (US)

(72) Inventors: Jack Lawson Bishop, III, Evanston, IL (US); Robert Hurlbut, Enfield, CT (US); Jason Conrad Starin, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 332 days.

(21) Appl. No.: 17/650,168

(22) Filed: Feb. 7, 2022

(65) Prior Publication Data
US 2023/0252158 A1 Aug. 10, 2023

(51) Int. Cl.
*G06F 21/57* (2013.01)
*G06F 40/194* (2020.01)

(52) U.S. Cl.
CPC .......... *G06F 21/577* (2013.01); *G06F 40/194* (2020.01); *G06F 2221/033* (2013.01)

(58) Field of Classification Search
None
See application file for complete search history.

(56) References Cited

U.S. PATENT DOCUMENTS

| | | | |
|---|---|---|---|
| 7,891,003 B2 | 2/2011 | Mir et al. | |
| 8,312,549 B2 | 11/2012 | Goldberg et al. | |
| 8,418,249 B1 | 4/2013 | Nucci et al. | |
| 9,094,288 B1 | 7/2015 | Nucci et al. | |
| 9,264,444 B2 | 2/2016 | Moore et al. | |
| 9,330,262 B2 | 5/2016 | Salehie et al. | |
| 9,390,260 B2 | 7/2016 | Tan et al. | |
| 9,516,053 B1 | 12/2016 | Muddu et al. | |
| 9,565,201 B2 | 2/2017 | Compagna et al. | |

(Continued)

OTHER PUBLICATIONS

Karbab EB, Debbabi M. MalDy: Portable, data-driven malware detection using natural language processing and machine learning techniques on behavioral analysis reports. Digital Investigation. Apr. 1, 2019;28:S77-87. (Year: 2019).*

(Continued)

*Primary Examiner* — James R Turchen

(57) ABSTRACT

A system includes a database, a memory, and a processor. The database stores data associated with a known security threat. The memory includes a threat model associated with a software application. The processor identifies, based on natural language processing of the data associated with the known security threat, one or more attributes of software susceptible to the known security threat. The processor also identifies, based on natural language processing of the threat model, one or more attributes of the software application. The processor additionally determines, based on a comparison between the one or more attributes of software susceptible to the known security threat and the one or more attributes of the software application, that the software application is susceptible to the known security threat. In response, the processor updates the threat model to reflect the susceptibility of the software application to the known security threat.

20 Claims, 3 Drawing Sheets

(56) References Cited

U.S. PATENT DOCUMENTS

| | | |
|---|---|---|
| 9,680,855 B2 | 6/2017 | Schultz et al. |
| 9,690,938 B1 | 6/2017 | Saxe et al. |
| 9,705,904 B1 * | 7/2017 | Davis .................. G06F 21/562 |
| 9,742,794 B2 | 8/2017 | Cabrera et al. |
| 9,910,986 B1 * | 3/2018 | Saxe ..................... G06N 5/025 |
| 9,979,743 B2 | 5/2018 | Hovor et al. |
| 10,200,399 B2 | 2/2019 | Agarwal |
| 10,216,938 B2 | 2/2019 | Reith et al. |
| 10,230,326 B2 | 3/2019 | Tiwari et al. |
| 10,298,555 B2 | 5/2019 | Murray |
| 10,318,735 B2 * | 6/2019 | Saxe ..................... G06N 3/04 |
| 10,339,472 B2 | 7/2019 | Sadaghiani et al. |
| 10,348,759 B2 | 7/2019 | Sultan et al. |
| 10,425,429 B2 | 9/2019 | Bassett |
| 10,432,671 B2 | 10/2019 | Joseph et al. |
| 10,459,593 B2 | 10/2019 | Tiwari et al. |
| 10,476,902 B2 | 11/2019 | Holzhauer et al. |
| 10,574,675 B2 | 2/2020 | Peppe et al. |
| 10,594,712 B2 | 3/2020 | Mestha et al. |
| 10,621,527 B2 | 4/2020 | Tiwari et al. |
| 10,652,266 B1 | 5/2020 | Tautschnig et al. |
| 10,681,071 B1 | 6/2020 | Pendergast et al. |
| 10,713,358 B2 * | 7/2020 | Sikorski ................ G06F 21/563 |
| 10,740,469 B2 | 8/2020 | Zheng et al. |
| 10,756,830 B2 | 8/2020 | Tiwari et al. |
| 10,855,717 B1 * | 12/2020 | Feiman .................. G06F 21/57 |
| 10,928,785 B2 | 2/2021 | Tiwari et al. |
| 11,036,897 B2 | 6/2021 | Tiwari et al. |
| 11,770,404 B2 | 9/2023 | McNee et al. |
| 2007/0162890 A1 | 7/2007 | Meier et al. |
| 2015/0222708 A1 | 8/2015 | Addepalli et al. |
| 2015/0347480 A1 | 12/2015 | Smart |
| 2015/0370560 A1 | 12/2015 | Tan et al. |
| 2015/0373043 A1 | 12/2015 | Wang et al. |
| 2016/0364927 A1 * | 12/2016 | Barry ..................... G08B 25/10 |
| 2017/0017793 A1 * | 1/2017 | Davis ....................... G06N 3/08 |
| 2017/0230179 A1 | 8/2017 | Mannan et al. |
| 2017/0244741 A1 * | 8/2017 | Ferrer ................... G06F 21/552 |
| 2017/0372071 A1 * | 12/2017 | Saxe ........................ G06N 3/08 |
| 2018/0075168 A1 | 3/2018 | Tiwari et al. |
| 2018/0351987 A1 | 12/2018 | Patel et al. |
| 2019/0019398 A1 | 1/2019 | Hender et al. |
| 2019/0052665 A1 * | 2/2019 | Mahieu .................... G06N 5/01 |
| 2019/0173904 A1 | 6/2019 | Wang |
| 2019/0207967 A1 * | 7/2019 | Vashisht ............. H04L 63/1408 |
| 2019/0369890 A1 * | 12/2019 | Danilov ................ G06F 3/0643 |
| 2020/0076835 A1 * | 3/2020 | Ladnai ............... G06Q 10/0635 |
| 2020/0137103 A1 * | 4/2020 | Ngo ........................ G06F 40/20 |
| 2020/0302058 A1 * | 9/2020 | Kenyon ................ G06F 21/554 |
| 2021/0258392 A1 | 8/2021 | Tiwari et al. |
| 2021/0357507 A1 | 11/2021 | Sulatycki et al. |
| 2021/0400071 A1 * | 12/2021 | Ray ......................... H04L 63/20 |
| 2022/0129561 A1 * | 4/2022 | Shivanna ............. G06F 16/951 |
| 2022/0131887 A1 * | 4/2022 | Ngweta ............... H04L 63/1433 |
| 2022/0147815 A1 | 5/2022 | Conwell et al. |
| 2023/0038196 A1 * | 2/2023 | Labreche .............. G06F 21/577 |
| 2023/0252158 A1 | 8/2023 | Bishop, III |
| 2023/0289604 A1 | 9/2023 | Chan et al. |

OTHER PUBLICATIONS

Cois CA, Kazman R. Natural Language Processing to Quantify Security Effort in the Software Development Lifecycle. InSEKE 2015 (pp. 716-721). (Year: 2015).*

Mimura M, Ito R. Applying NLP techniques to malware detection in a practical environment. International Journal of Information Security. Apr. 2021;21(2):279-91. (Year: 2021).*

* cited by examiner

SYSTEM AND METHOD FOR DYNAMICALLY UPDATING EXISTING THREAT MODELS BASED ON NEWLY IDENTIFIED ACTIVE THREATS

TECHNICAL FIELD

The present disclosure relates generally to information security and vulnerability assessment of source code, and more particularly, to a system and method for dynamically updating existing threat models based on newly identified active threats.

BACKGROUND

Threat modeling is a process through which security vulnerabilities within a software application are identified, detailed, and prioritized. In particular, generating a threat model for a given software application typically involves (1) decomposing the application (for example, into a data flow diagram) to gain an understanding of the application and how it interacts with external entities, (2) determining the security threats to which the application is susceptible, (3) ranking those threats, and (4) identifying mitigation/countermeasures to address the threats. Threat models are not only resource intensive to build, they are also resource intensive to maintain. In particular, when a new threat is discovered, significant effort may be expended in investigating all of the (potentially thousands of) existing threat models to determine which, if any, should be updated to reflect the threat (i.e., which, if any, are associated with applications that are susceptible to the threat).

SUMMARY

This disclosure contemplates a threat modeling tool for use with a collection of previously generated threat models. The tool is configured to automatically and efficiently identify threat models that may be impacted by the discovery of a new threat that was not known at the time the threat models were generated. In particular, the tool uses natural language processing and machine learning techniques to parse descriptions of newly identified threats distinct from the applicable threat model to extract software attributes that are indicative of susceptibility to those new threats. The tool then compares those attributes with attributes extracted from the existing threat models, to identify those threat models that may be impacted by the newly identified threats (e.g., those threat models that should likely be updated to reflect the newly identified threats).

By automatically identifying those threat models that are likely impacted by a newly identified security threat, certain embodiments of the tool provide enhanced security. In particular, by automatically identifying which software applications are susceptible to given security threats, certain embodiments enable resources to be directed towards addressing/mitigating those security threats, rather than being expended on first investigating each of the potentially thousands of software applications that are installed within a given system to determine which applications may be impacted by the threat. In this manner, certain embodiments may enable resolution of actual security vulnerabilities sooner than otherwise, thereby helping to reduce the probability that such vulnerabilities are identified by bad actors and used to gain access to the system. In particular, certain embodiments may aid in providing improved security to a computer system, by helping to reduce the likelihood of virus and/or malware infections. This in turn may (1) conserve processing and memory resources that would otherwise be consumed by the viruses/malware operating within the system, (2) allow the software installed on that system to run faster and smoother, avoiding system crashes/failures that may be caused by the viruses/malware, (3) conserve networking resources that may otherwise be expended by the virus/malware communicating with other systems (e.g., in an attempt to infect those other systems), and (4) protect data stored within the system from corruption by the viruses/malware, avoiding the need to expend computational resources in reproducing corrupted data. Certain embodiments of the tool are described below.

According to an embodiment, a system includes a database, a memory, and a hardware processor communicatively coupled to the memory and to the database. The database includes data associated with a known security threat. The known security threat was discovered at a first time. The memory includes a threat model associated with a software application. The threat model was created at a second time earlier than the first time. The hardware processor identifies, based on natural language processing of the data associated with the known security threat, one or more attributes of software susceptible to the known security threat. The hardware processor also identifies, based on natural language processing of the threat model, one or more attributes of the software application. The hardware processor additionally determines, based on a comparison between the one or more attributes of software susceptible to the known security threat and the one or more attributes of the software application, that the software application is susceptible to the known security threat. In response to determining that the software application is susceptible to the known security threat, the hardware processor updates the threat model to reflect the susceptibility of the software application to the known security threat.

The tool described in the present disclosure may be integrated into a practical application of a threat modeling tool that can automatically identify those threat models that may be impacted by the discovery of a new security threat. In this manner, the tool may conserve considerable human and computational resources that would otherwise be expended as part of an external review process during which, each time a new threat is identified, every threat model in the system is investigated to determine whether the associated software application is susceptible to the new threat, and, accordingly, whether the threat model should be updated to reflect the new threat. This is turn may provide improved security to the computer system on which the tool is installed. In particular, given that organizations are typically only able to direct a finite amount of resources towards application security, focusing those resources on the threat models and associated applications that are likely impacted by a newly identified security threat means that security vulnerabilities may be resolved sooner than would otherwise be the case, thereby reducing the likelihood that the vulnerability is identified and used by viruses/malware to gain access to the computer system.

Furthermore, by automatically identifying, analyzing, and updating those threat models that are impacted by the discovery of a new threat, certain embodiments of the tool may enable addressing security vulnerabilities from a system sooner than otherwise, thereby reducing the likelihood that a bad actor is able to identify and use such vulnerabilities to gain access to the system. In this manner, certain embodiments of the tool may help to protect the system on which the tool is installed from unintentional data loss and/or other undesirable consequences of bad actors using unmitigated vulnerabilities to gain access to the system. For example, the tool may prevent viruses/malware from gaining access to the system and consuming system resources otherwise available to valid applications operating within the system (e.g., processing resources consumed by the operation of the viruses/malware, networking resources consumed by the viruses/malware attempting to spread to other computer systems, etc.). This may enable those valid applications to run faster and smoother than on an infected system, and may protect the system from system failures/crashes that lead to unintentional system downtime, interrupted processes, and/or data loss.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
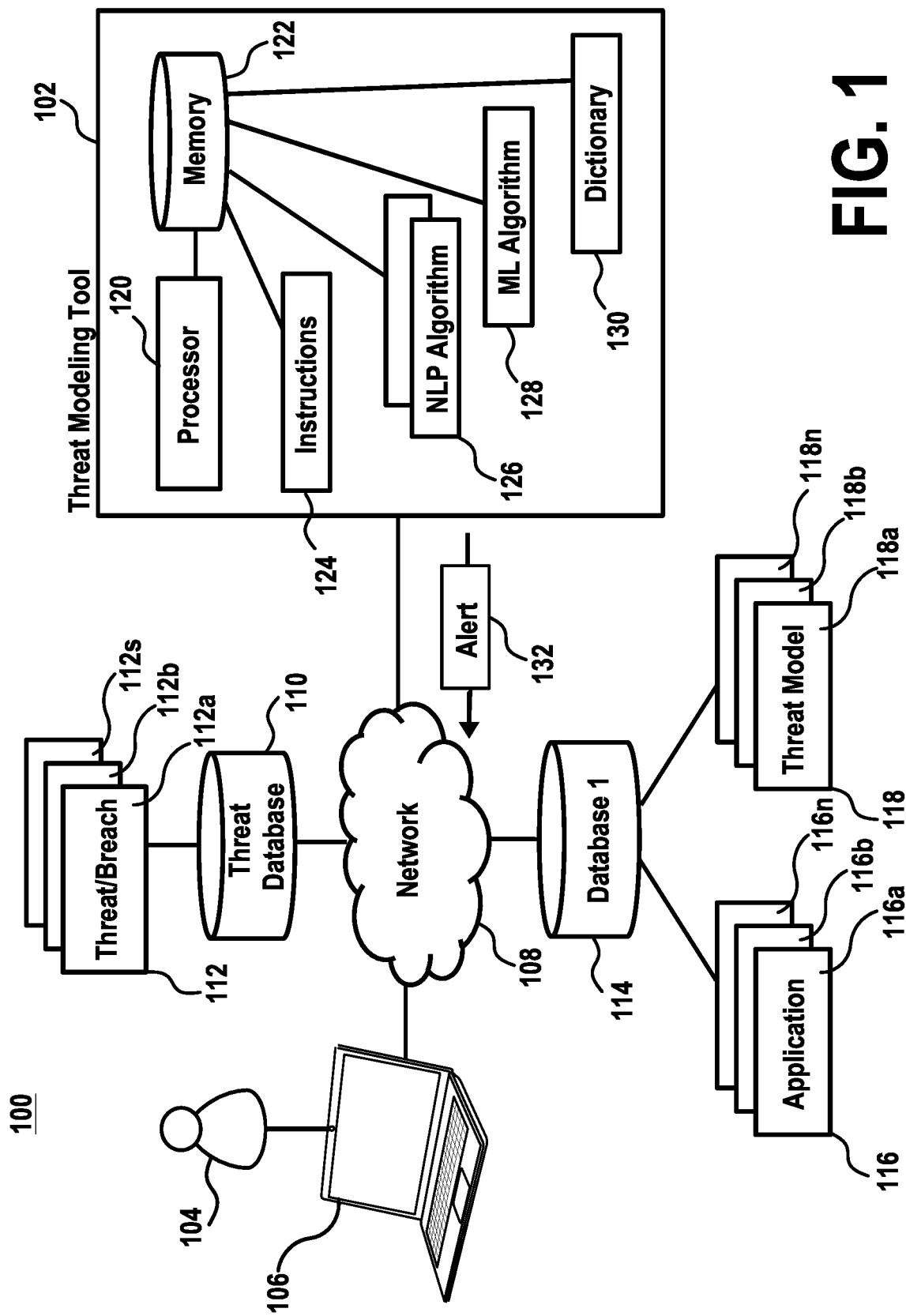
FIG. 1 illustrates an example dynamic threat modeling system.
Figure 2:
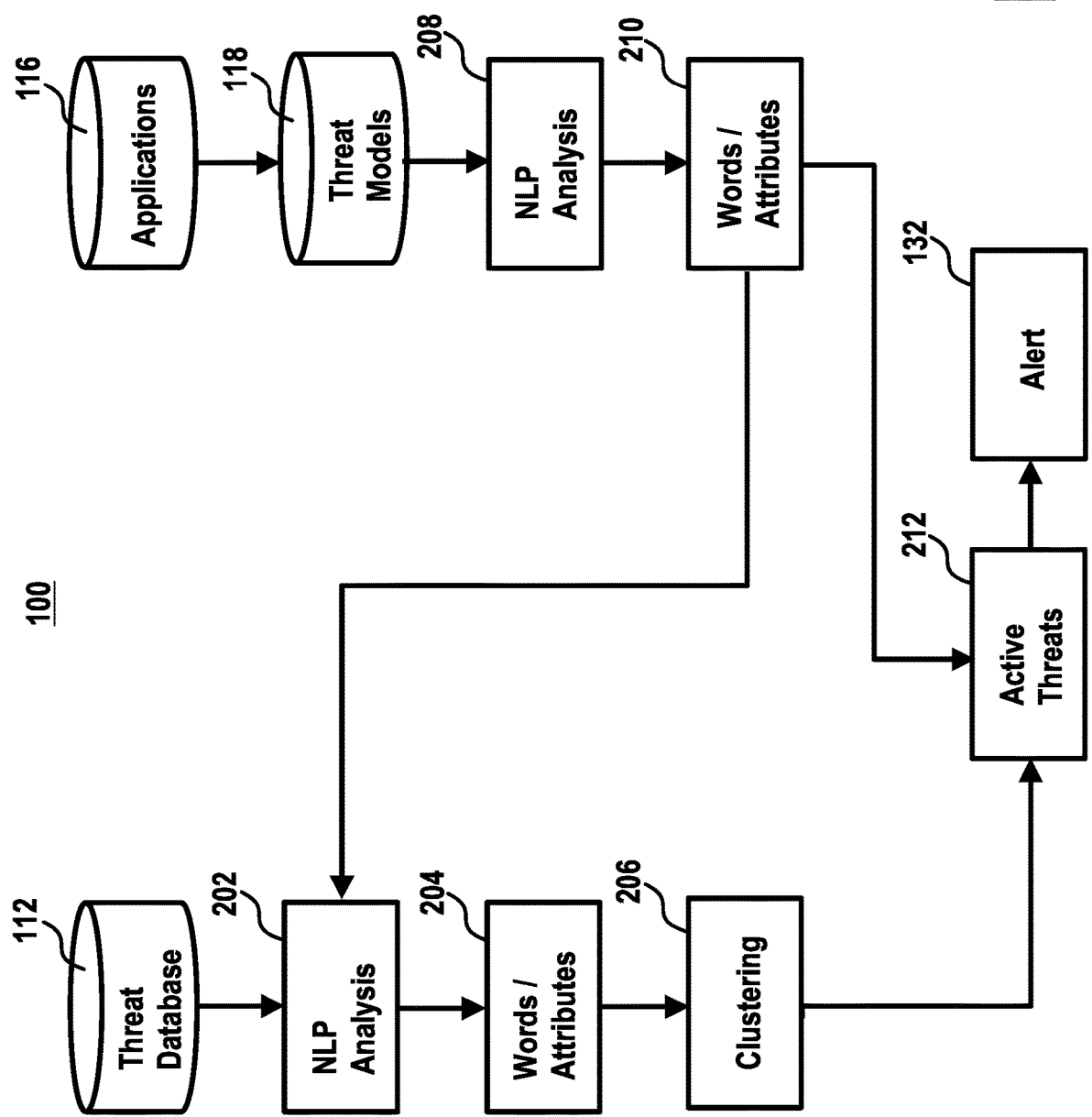
FIG. 2 illustrates an example process by which the threat modeling tool of the system of FIG. 1 identifies threat models that may be impacted by a newly discovered security threat.
Figure 3:
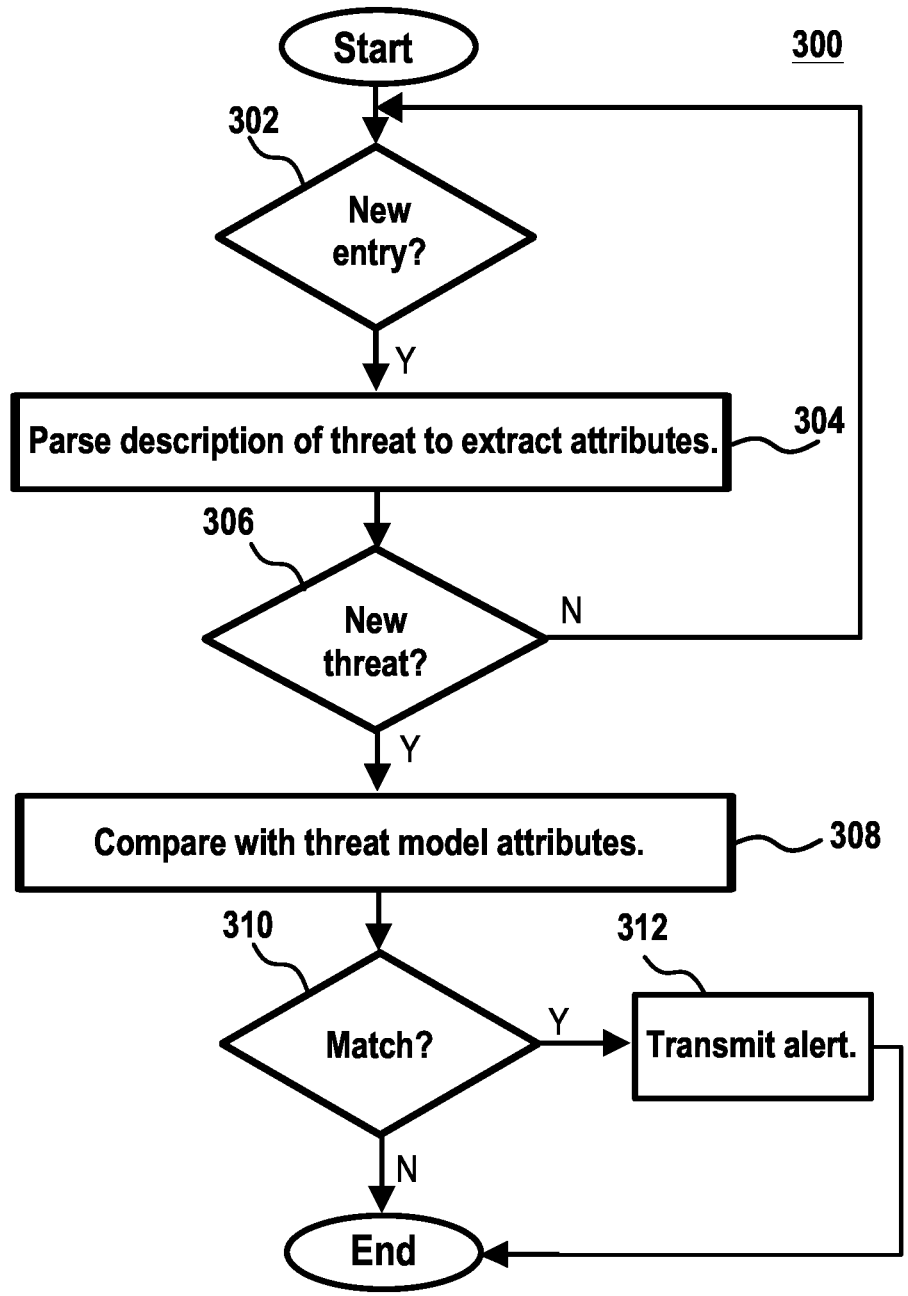
FIG. 3 presents a flowchart illustrating the operation of the threat modeling tool of the system of FIG. 1.

Embodiments of the present disclosure and its advantages may be understood by referring to FIGS. 1 through 3 of the drawings, like numerals being used for like and corresponding parts of the various drawings.

I. System Overview

FIG. 1 illustrates an example dynamic threat modeling system 100 that includes user(s) 104 (e.g., system administrator(s), security specialist(s), etc.), device(s) 106, network 108, threat database 110, internal database 114, and threat modeling tool 102. As illustrated in FIG. 1, threat database 110 stores information 112 about cyber security threats, viruses, malware, known security breaches, and/or any other information related to cyber security separate and distinct from threat models. Internal database 114 stores a set of threat models 118 generated for the software applications 116 executing within system 100. Each threat model 118 was generated at a given point in time, based on the security threat information 112 that existed at that point in time. Thus, as the threat landscape evolves and new threats are discovered, threat models 118 may become obsolete if not updated. However, it is a time consuming and resource intensive process to identify that new security threats have been discovered and to identify which of the (potentially thousands of) threat models 118 should be updated, to reflect the newly identified security threats. Accordingly, considerable processing and memory resources may be saved by automatically identifying that new security threats have been discovered, and automatically flagging a subset of threat models 118 for further investigation/updating, in response to identifying a new security threat 112.

Threat modeling tool 102 is configured to automatically identify that a new threat 112 has been discovered, and to automatically identify those threat models 118 that may be impacted by the newly discovered threat 112, in a computationally efficient manner. In particular, the tool is configured to apply one or more natural language processing algorithms 126. Further details of the manner by which vulnerability triage tool 102 performs these tasks are presented below, and in the discussion of FIGS. 2 and 3.

Device(s) 106 are used by user(s) 104 (e.g., security specialists) to: (1) communicate with threat modeling tool 102; (2) review threat models 118, and/or (3) update threat models 118 to reflect information 112 about newly identified threats. As an example, user 104 may use device 106 to receive an alert 132 from threat modelling tool 102 identifying one or more threat models 118 that may be impacted by a newly identified threat 112. As another example, user 104 may use device 106 to update one or more threat models 118 in response to receiving an alert 132 from threat modelling tool 102. Device 106 may be configured to display alert 132 to user 104 in any suitable manner. For example, device 106 may display alert 132 to user 104 in the form of an SMS message, an email message, a pop-up message, information displayed on a GUI accessible through an application installed on device 106 and/or accessible through a web application installed on device 106 and/or in any suitable manner.

Devices 106 include any appropriate device for communicating with components of system 100 over network 108. For example, devices 106 may include a mobile phone, a computer, a laptop, a wireless or cellular telephone, a tablet, a server, an IoT device, and/or an automated assistant, among others. This disclosure contemplates devices 106 being any appropriate device for sending and receiving information over network 108, and/or displaying information (e.g., alerts 132, threat models 118, etc.). In some embodiments, device 106 may include a display, a keypad, or other appropriate terminal equipment usable by user 104. In some embodiments, an application executed by a processor of device 106 may perform the functions described herein.

Network 108 facilitates communications between components of system 100 including, for example, threat modeling tool 102, devices 106, threat database 110, and/or internal database 114. Network 108 may include any interconnecting systems capable of transmitting audio, video, signals, data, messages, or any combination of the preceding. For example, network 108 may include all or a portion of a public switched telephone network (PSTN), a public data network, a metropolitan area network (MAN), a wide area network (WAN), a local, regional, or global communication or computer network, such as the Internet, a wireline or wireless network, or any other suitable communication link, including combinations thereof, operable to facilitate communication between components of system 100. While illustrated in FIG. 1 as a single network 108, in certain embodiments, network 108 may include multiple networks. For example, network 108 may include an internal network belonging to the organization to which threat modeling tool 102 belongs and an external network, such as the Internet. In some such embodiments, internal database 114 may be accessible over the internal portion of network 108, while threat database 110 may be accessible over the external portion of network 108.

Threat database 110 is any storage location where information about security threats 112 is stored. Threat database 110 may include information about viruses, malware, security breaches, and/or any other information about security threats that have been discovered. Each entry 112a through 112s of threat database 110 is associated with a given security threat and includes information about that security threat. For example, a given entry 112a may include a description of the corresponding security threat, including, for example, a description of the attributes of software that may be susceptible to the security threat. Threat database 110 may be a publicly accessible database that is updated each time a new security threat is identified. While illustrated in FIG. 1 as a single database, threat database 110 may correspond to any number of storage locations in which threat information 112 may be stored. For example, threat database 110 may include a structured threat information expression (STIX) database, a trusted automated exchange of intelligence information (TAXII) database, a common weaknesses enumeration (CWE) database, a common vulnerabilities and exposures (CVE) database, one or more websites, one or more blogs, and/or any other location from which threat information may be obtained.

Internal database 114 is any storage location within system 100 where applications 116 and/or threat models 118 are stored. Applications 116 include any software applications executing within system 100. Applications 116 may be written in any suitable programming language including, for example, C++, C #, Java, Python, Scala, JavaScript, Perl, Ruby, HTML, any other suitable programming language, and/or any suitable combination of the preceding. Each application 116a through 116n may include one or more standard packages, libraries, and/or functions. One or more applications 116 may also be subject to security vulnerabilities. Such vulnerabilities may include, for example, vulnerabilities related to: (1) SQL injection; (2) cross-site scripting; (3) buffer overflows; (4) potential NULL pointer dereferences; (5) writes to potentially read-only memory; (6) use of memory that has already been deallocated; (7) use of out-of-scope memory; (8) presence of a hard-coded vulnerability with the source code (e.g., hard-coded password, credential, security token, etc.), and/or (9) any other security vulnerability that may be associated with a software application.

Each application 116a through 116n is associated with a corresponding threat model 118a through 118n. For example, threat model 118a is a threat model for application 116a, threat model 118b is a threat model for application 116b, etc. Each threat model 118a through 118n includes information related to the security of the corresponding application 116a through 116n. For example, in certain embodiments, each threat model 118 corresponds to a structured representation of all of the information that is related to and/or affects the security of the corresponding application 116. Each threat model 118 may include an identification of the potential threats that may affect the corresponding application 116, as well as actions that may be taken to address/mitigate each threat.

While illustrated in FIG. 1 as being a single database, internal database 114 may correspond to any number of storage locations within system 100. For example, database 114 may correspond to one or more databases, servers, local storage systems, cloud storage systems, and/or any other suitable storage location.

As illustrated in FIG. 1, threat modeling tool 102 includes processor 120 and memory 122. This disclosure contemplates processor 120 and memory 122 being configured to perform any of the functions of threat modeling tool 102 described herein. Generally, threat modeling tool 102 is configured to (1) monitor threat database 110 for new entries 112, (2) identify that a new threat has been discovered, by determining that a new entry 112 corresponds to a new threat (rather than, for example, a new description of a previously identified threat); (3) use NLP algorithm 126 to parse the description of the new threat 112 to extract relevant features/attributes, (4) use NLP algorithm 126 to parse threat models 118 to extract relevant features/attributes, (5) identify, based on a comparison between the features/attributes extracted from the description of the new threat 112 and the features/attributes extracted from threat models 118, that one or more software applications 116 (corresponding to particular threat models 118) are susceptible to the new threat 112, (6) update the corresponding threat models 118, and/or (7) alert a system administrator/security specialist 104 to the relevance of the new threat 112 to the identified threat models 118. The manner by which threat modeling tool 102 performs these functions is described in further detail below, and in the discussion of FIGS. 2 and 3.

Processor 120 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 122 and controls the operation of threat modeling tool 102. Processor 120 may be 8-bit, 16-bit, 32-bit, 64-bit or of any other suitable architecture. Processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 120 may include other hardware and software that operates to control and process information. Processor 120 executes software (e.g., instructions 124) stored on memory 122 to perform any of the functions described herein. Processor 120 controls the operation and administration of threat modeling tool 102 by processing information received from device(s) 106, network 108, threat database 110, internal database 114, and/or memory 122. Processor 120 may be a programmable logic device, a microcontroller, a microprocessor, any suitable processing device, or any suitable combination of the preceding. Processor 120 is not limited to a single processing device and may encompass multiple processing devices.

Memory 122 may store, either permanently or temporarily, data, operational software, or other information/instructions 124 for processor 120. Memory 122 may include any one or a combination of volatile or non-volatile local or remote devices suitable for storing information. For example, memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 122, a disk, a CD, or a flash drive. In particular embodiments, the software may include an application executable by processor 120 to perform one or more of the functions described herein.

In certain embodiments, memory 122 may also store one or more natural language processing (NLP) algorithms 126, one or more machine learning algorithms 128, and a dictionary of words 130. NLP algorithm 126 is any suitable natural language processing algorithm that is configured to parse descriptions of threats 112 and/or threat models 118, and to extract relevant features/attributes. For example, NLP algorithm 126 may be trained to extract words of a dictionary of words 130 associated with security threats and/or software features, components, etc. (collectively referred to as attributes). Dictionary of words 130 may include words such as the names of software functions, the names of software libraries, the names of encryption methods, etc. Dictionary of words 130 may be generated using information about historical threats 112 stored in threat database 110, the content of threat models 118, and/or any other suitable information. NLP algorithm 126 may implement any suitable natural language processing techniques including, for example, tokenization, normalization, lemmatization, etc. In certain embodiments, NLP algorithm 126 may include a machine learning clustering algorithm configured to cluster threats 112 and/or the information extracted from the descriptions of threats 112 based on a measure of the similarity between the information extracted from the descriptions of threats 112. For example, the clustering algorithm may be configured to determine that a first description of a threat 112a and a second description of a threat 112b both correspond to the same threat (e.g., the first description of the threat 112a corresponds to a blog posting about a threat and the second description of the threat 112b corresponds to an entry in a threat database about the same threat). As another example, the clustering algorithm may be configured to determine that a first description of a threat 112a and a second description of a threat 112b both correspond to threats that affect the same (or similar) software components. NLP algorithm 126 may be configured to perform such clustering in any suitable manner. For example, in certain embodiments, NLP algorithm 126 is configured to use fuzzy logic to perform such clustering. In certain embodiments, NLP algorithm 126 includes more than one natural language processing algorithm. For example, NLP algorithm 126 may include a first natural language processing algorithm to parse and extract information from descriptions of threats 112 and a second natural language processing algorithm to parse and extract information from threat models 118.

Machine learning algorithm 128 is any suitable machine learning algorithm that is configured to compare the information extracted by NLP algorithm 126 from a description of a newly identified threat 112a with the information extracted by NLP algorithm 126 from threat models 118, and to identify any threat models 118 for which the newly identified threat is relevant. In certain embodiments, machine learning algorithm 128 is a neural network model. For example, machine learning algorithm 128 may be a neural network model that has been trained based on historical information extracted from previously identified threats 112 and existing threat models 118, to identify those threat models 118 for which a newly identified threat 112 is relevant. Machine learning algorithm 128 may be a supervised machine learning algorithm, an unsupervised machine learning algorithm, a reinforcement learning algorithm, and/or any other suitable form of machine learning algorithm. In some embodiments, machine learning algorithm 128 may implement fuzzy logic to perform comparisons between the information extracted from the description of a newly identified threat 112 and the information extracted from existing threat models 118.

In certain embodiments, machine learning algorithm 128 may be configured to update threat models 118 to reflect a newly identified threat 112. For example, machine learning algorithm 128 may be configured to determine that a newly identified threat 112 is relevant to multiple threat models 118 (e.g., each software application associated with those multiple threat models is susceptible to the newly identified threat), and that one of those threat models 118a has already been updated to account for the newly identified threat. Machine learning algorithm 128 may then be configured to update the remaining threat models in a similar manner.

Modifications, additions, or omissions may be made to the systems described herein without departing from the scope of the invention. For example, system 100 may include any number of existing users 104, devices 106, networks 108, threat databases 110, descriptions of threats 112, internal databases 114, software applications 116, threat models 118, processors 120, memories 122, NLP algorithms 126, machine learning algorithms 128, and dictionaries 130. The components may be integrated or separated. Moreover, the operations may be performed by more, fewer, or other components. Additionally, the operations may be performed using any suitable logic comprising software, hardware, and/or other logic.

II. Process for Automatically Identifying Threat Models for which a Newly Identified Threat is Relevant FIG. 2 illustrates an example process by which threat modeling tool 102 identifies, for a newly discovered security threat 112, a subset of threat models 118 for which the security threat 112 is relevant.

Threat modeling tool 102 is configured to monitor one or more databases 110, which store information about known (including newly discovered) security threats 112. Such monitoring may take any suitable form. For example, in certain embodiments, threat modeling tool 102 may be configured to check each threat database 110 at regular intervals and to determine whether the database has been updated since the last time the tool checked the database. In some embodiments, threat modeling tool 102 may be configured to receive alerts from threat database 110 in response to any updates made to the database.

In response to determining that new information has been added to threat database 110 (e.g., determining that a new threat entry 112a has been added to threat database 110), threat modeling tool 102 is configured to perform NLP analysis 202 on the description of the new threat entry 112a, to extract relevant information 204 from the description of the threat. In particular, threat modeling tool 102 is configured to apply NLP algorithm 126 to the description of the threat 112a. As described above, in the discussion of FIG. 1, NLP algorithm 126 is any suitable natural language processing algorithm that is configured to parse a description of a security threat and to extract relevant information/attributes from the description. Such information/attributes may include the names of software functions, libraries, encryption algorithms, etc. that may be susceptible to the associated security threat. Threat modeling tool 102 may be configured to train NLP algorithm 126 to perform such functions in any suitable manner. For example, in certain embodiments, threat modeling tool 102 may be configured to parse existing entries in threat database 110, which are associated with known threats 112, and to generate a dictionary 130 of relevant words/attributes extracted from such known threats. In some embodiments, threat modeling tool 102 may be configured to use words/attributes extracted from threat models 118, in addition to words/attributes extracted from known threats 112, to generate dictionary 130.

In response to applying NLP algorithm 126 to a new threat entry 112 in order to extract relevant words/attributes 204, threat modeling tool 102 is configured to performing clustering 206. During clustering 206, threat modeling tool 102 is configured to group the information extracted from threat descriptions 112 based on their similarity (as determined using a suitable similarity measure). As an example, during clustering 206, threat modeling tool 102 may determine, based on the information extracted from a first description of a threat 112a and the information extracted from a second description of a threat 112b, that both the first description 112a and the second description 112b correspond to the same threat. For instance, the first description 112a may correspond to a blog posting about a threat and the second description 112b may correspond to an entry in a threat database detailing that same threat. As another example, in certain embodiments, threat modeling tool 102 may be configured to determine that a first description of a threat 112a and a second description of a threat 112b both correspond to threats that affect the same (or similar) software components. For example, while the first description 112a and the second description 112b may correspond to different threats, they may both be related to a given open source software library.

During clustering 206, threat modeling tool 102 may be configured to identify that a new threat 112a has been discovered. For example, threat modeling tool 102 may be configured to determine that one or more new threat entries 112 do not correspond to any known threats that are already reflected in threat models 118 (e.g., the one or more new threat entries 112 do not belong to any of the same clusters as known threats that have already been taken into account by threat models 118). Similarly, threat modeling tool 102 may be configured to determine that a new threat entry 112a does not correspond to a newly discovered threat, based on clustering of the new threat entry 112a with one or more known threats that are already reflected in threat models 118. Threat modeling tool 102 may perform clustering 206 in any suitable manner. For example, in certain embodiments, threat modeling tool 102 may use fuzzy logic to perform clustering 206.

As illustrated in FIG. 2, system 100 also includes a set of threat models 118 that were generated for software applications 116 executing within the system. Threat models 118 may have been generated in any suitable manner. For example, threat models 118 may be been generated manually by security specialists 104, through the use of one or more threat modeling applications, and/or through manual threat modeling in combination with the use of one or more threat modeling applications/tools. Each threat model 118a through 118n may include any suitable information. For example, each threat model 118a through 118n may include an augmented data flow diagram for the corresponding software application 116a through 116n.

Threat modeling tool 102 is configured to perform NLP analysis 208 on threat models 118, to extract relevant information/attributes 210 from threat models 118. In particular, threat modeling tool 102 is configured apply NLP algorithm 126 to each threat model 118 to extract relevant information/attributes from the model. NLP algorithm 126 may be the same natural language processing algorithm that was used by threat modeling tool 102 to extract information/attributes from threat descriptions 112, or NLP algorithm 126 may be a different natural language processing algorithm. As illustrated in FIG. 2, the words/attributes extracted by NLP algorithm 126 from threat models 118 may be fed into NLP analysis 202, to aid in creating dictionary 130 and training NLP algorithm 126.

In response to extracting relevant words/attributes 210 from threat models 118, threat modeling tool 102 is configured to use words/attributes 210 to identify any threat models 118 that are impacted by the discovery of a new threat 112. In particular, threat modeling tool 102 is configured to compare the words/attributes 204 extracted from a description of the new threat 112 with the words/attributes 210 extracted from each threat model 118, to identify for which threat models 118 the newly identified threat 112 is relevant. As an example, in certain embodiments, threat modeling tool 102 is configured to determine that a given threat model 118 is impacted by a newly identified threat 112 by comparing a cluster of words/attributes that includes the words/attributes 204 extracted from the description of the newly identified threat 112 and which was generated during clustering 206, with the words/attributes 210 extracted from the given threat model 118. As another example, in some embodiments, threat modeling tool 102 is configured to directly compare words/attributes 204 with words/attributes 210 to determine that a given threat model 118 is impacted by a newly identified threat 112.

Threat modeling tool 102 may be configured to perform such comparisons in any suitable manner. For example, threat modeling tool 102 may be configured to directly compare the words/attributes 210 extracted from the given threat model 118 with the words/attributes 204 extracted from the description of the new threat 112 and to determine that the given threat model 118 is impacted by the new threat 112 based on matching of words/attributes 210 with words/attributes 204 (e.g., matching of all words/attributes 210 with words/attributes 204 or matching of a minimum percentage of words/attributes 210 with words/attributes 204). As another example, threat modeling tool 102 may be configured to compare the words/attributes 210 extracted from the given threat model 118 with the words/attributes 204 extracted from the description of the new threat 112 using machine learning algorithm 128. Machine learning algorithm 128 may be any suitable machine learning algorithm trained to identify threat model(s) impacted by a newly discovered threat 112, based on the words/attributes 210 extracted from the threat models 118 and the words/attributes 204 extracted from the description of the newly identified threat 112. For instance, in certain embodiments, machine learning algorithm 128 may use fuzzy logic to perform such identifications.

In response to identifying one or more threat models 118 for which a newly discovered threat 112 is relevant, threat modeling tool 102 is configured to store an identification of the threat 112 and the relevant threat models 118 as an active threat 212. Threat modeling tool 102 is also configured to generate an alert 132 notifying a security specialist 104 of the active threat 212. Alert 132 may take any suitable form. For example, alert 132 may correspond to an SMS message, an email message, a pop-up message, information presented on a GUI, and/or any other suitable form of alert.

By automatically identifying those threat models that may be impacted by the discovery of a new security threat 112, threat modeling tool 102 may conserve considerable human and computational resources that would otherwise be expended as part of an external review process during which, each time a new threat 112 is identified, every threat model 118 in the system is investigated to determine whether the associated software application is susceptible to the new threat, and, accordingly, whether the threat model should be updated to reflect the new threat. This is turn may provide improved security to system 100.

FIG. 3 presents a flowchart illustrating an example method 300 (described in conjunction with elements of FIGS. 1 and 2) used by threat modeling tool 102 to identify those threat models 118 for which a newly discovered threat 112 may be relevant.

During process 302, threat modeling tool 102 monitors for the addition of a new threat description 112 to threat database 110. If, during process 302 threat modeling tool 102 determines that a new threat description 112 has been added to threat database 110, during process 304 threat modeling tool 102 using NLP algorithm 126 to parse the description of the threat 112 and to extract relevant words/attributes from the description. In certain embodiments, threat modeling tool 102 additionally compares the extracted words/attributes to words/attributes extracted from other threat descriptions 112, and clusters together similar collections of words/attributes. During process 306, threat modeling tool 102 determines if the new threat description 112 corresponds to a newly discovered threat. Threat modeling tool 102 may determine whether new threat description 112 corresponds to a newly discovered threat in any suitable manner. As example, threat modeling tool 102 may be configured to use a machine learning algorithm trained to identify newly discovered threats, based on the words/attributes extract from the description of a threat. In certain embodiments, threat modeling tool 102 may determine, based on the result of clustering, whether a new threat description 112 corresponds to a newly discovered threat. For instance, threat modeling tool 102 may determine that a new threat description 112 does not correspond to a newly discovered threat based on clustering that groups together the new threat description 112 with other threat descriptions that correspond to threats which are already reflected by threat models 118. On the other hand, threat modeling tool 102 may determine that a new threat description 112 corresponds to a newly discovered threat based on clustering that does not group the new threat description 112 with any other threat descriptions that correspond to threats which are already reflected by threat models 118. If, during process 306 threat modeling tool 102 determining that threat description 112 does not correspond to a newly discovered threat, method 300 returns to process 302.

If, during process 306 threat modeling tool 102 determines that threat description 112 does correspond to a newly discovered threat, during process 308, threat modeling tool 102 compares the words/attributes extracted from the description of the newly discovered threat 112 with words/attributes extracted from the threat models 118 stored within the system 100. For example, in certain embodiments, threat modeling tool 102 uses a machine learning algorithm 128 to compare the words/attributes extracted from the description of the newly discovered threat 112 with the words/attributes extracted from threat models 118.

During process 310, threat modeling tool 102 determines whether the comparison performed during process 308 produced any matches, indicating that the newly identified threat 112 is relevant to any of the existing threat models 118. If, during process 310, threat modeling tool 102 determines that one or more threat models 118 are impacted by the newly discovered threat 112, during process 312 threat modeling tool 102 generates an alert 132, notifying a security specialist 104 that the identified threat models 118 should be updated to reflect the newly identified threat 112.

Modifications, additions, or omissions may be made to method 300 depicted in FIG. 3. Method 300 may include more, fewer, or other steps. For example, steps may be performed in parallel or in any suitable order. While discussed as threat modeling tool 102 (or components thereof) performing certain steps, any suitable components of system 100, including, for example, devices 106, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a database comprising data associated with a known security threat, wherein the data for the known security threat comprises a first description associated with the known security threat;
   a memory comprising a threat model associated with a software application; and
   a hardware processor communicatively coupled to the memory and to the database, the hardware processor configured to:
      monitor the database at a regular interval to determine whether the database receives data associated with a new security threat, wherein the data associated with the new security threat comprises a new description associated with the new security threat;
      in response to determining that the data associated with the new security threat is added to the database, the processor is configured to:
      extract, based on natural language processing of the first description, information associated with the first description;
      extract, based on natural language processing of the new description, information associated with the new description;
      determine, based on a comparison of the information associated with the first description and the information associated with the new description, that the new security threat does not correspond to the known security threat in the database;
      in response to determining that the new security threat does not correspond to the known security threat in the database, the processor is further configured to:
      identify, based on natural language processing of the new description associated with the new security threat, one or more attributes of software susceptible to the new security threat;
      identify, based on natural language processing of the threat model, one or more attributes of the software application;
      determine, based on a comparison between the one or more attributes of software susceptible to the new security threat and the one or more attributes of the software application, that the software application is susceptible to the new security threat; and
      in response to determining that the software application is susceptible to the new security threat, update the threat model to reflect the susceptibility of the software application to the new security threat.

2. The system of claim 1, wherein determining that the software application is susceptible to the new security threat comprises determining that the one or more attributes of the software susceptible to the new security threat match the one or more attributes of the software application.

3. The system of claim 1, wherein determining that the software application is susceptible to the new security threat comprises:
   determining a similarity score between the one or more attributes of the software susceptible to the new security threat and the one or more attributes of the software application; and
   determining that the similarity score is greater than a threshold.

4. The system of claim 3, wherein determining the similarity score comprises applying a machine learning clustering algorithm.

5. The system of claim 1, wherein in response to determining that the software application is susceptible to the new security threat, the hardware processor is further configured to generate an alert indicating that the software application is susceptible to the new security threat.

6. The system of claim 1, wherein the one or more attributes of the software application comprise at least one of a function or a library used within the software application.

7. The system of claim 1, wherein:
   the memory further comprises a second threat model associated with a second software application; and
   the hardware processor is further configured to:
      identify, based on natural language processing of the second threat model, one or more attributes of the second software application; and
      determine, based on a comparison between the one or more attributes of the software susceptible to the known security threat and the one or more attributes of the second software application, that the second software application is not susceptible to the known security threat.

8. A method comprising:
   monitoring a database comprising data associated with a known security threat at a regular interval to determine whether the database receives data associated with a new security threat, wherein the data associated with the known security threat comprises a first description associated with the known security threat, wherein the data associated with the new security threat comprises a new description associated with the new security threat;
   in response to determining that the new security threat is added to the database, the method further comprises:
   extracting, based on natural language processing of the first description, information associated with the first description;
   extracting, based on natural language processing of the new description, information associated with the new description;
   determining, based on a comparison of the information associated with the first description and the information associated with the new description, that the new security threat does not correspond to the known security threat in the database;
   in response to determining that the new security threat does not correspond to the known security threat in the database, the method further comprises:
   identifying, based on natural language processing of the new description associated with the new security threat, one or more attributes of software susceptible to the new security threat;
   identifying, based on natural language processing of a threat model associated with a software application, one or more attributes of the software application;
   determining, based on a comparison between the one or more attributes of software susceptible to the new security threat and the one or more attributes of the software application, that the software application is susceptible to the known security threat; and
   in response to determining that the software application is susceptible to the new security threat, updating the threat model to reflect the susceptibility of the software application to the new security threat.

9. The method of claim 8, wherein determining that the software application is susceptible to the new security threat comprises determining that the one or more attributes of software susceptible to the new security threat match the one or more attributes of the software application.

10. The method of claim 8, wherein determining that the software application is susceptible to the new security threat comprises:
    determining a similarity score between the one or more attributes of software susceptible to the new security threat and the one or more attributes of the software application; and
    determining that the similarity score is greater than a threshold.

11. The method of claim 10, wherein determining the similarity score comprises applying a machine learning clustering algorithm.

12. The method of claim 8, wherein in response to determining that the software application is susceptible to the new security threat, the method further includes generating an alert indicating that the software application is susceptible to the new security threat.

13. The method of claim 8, wherein the one or more attributes of the software application comprise at least one of a function or a library used within the software application.

14. The method of claim 8, further comprising:
    identifying, based on natural language processing of a second threat model associated with a second software application, one or more attributes of the second software application; and
    determining, based on a comparison between the one or more attributes of software susceptible to the new security threat and the one or more attributes of the second software application, that the second software application is not susceptible to the new security threat.

15. A non-transitory computer-readable medium comprising instructions that, when executed by a hardware processor, cause the processor to:
    monitor a database comprising data associated with a known security threat at a regular interval to determine whether the database receives data associated with a new security threat, wherein the data associated with the known security threat comprises a first description associated with the known security threat, wherein the data associated with the new security threat comprises a new description associated with the new security threat;
    in response to determining that the new security threat is added to the database, the instructions when executed by the processor, cause the processor to:
    extract, based on natural language processing of the first description, information associated with the first description;
    extract, based on natural language processing of the new description, information associated with the new description;
    determine, based on a comparison of the information associated with the first description and the information associated with the new description, that the new security threat does not correspond to the known security threat in the database;

in response to determining that the new security threat does not correspond to the known security threat in the database, the instructions when executed by the processor, cause the processor to:

identify, based on natural language processing of the new description associated with the new security threat, one or more attributes of software susceptible to the new security threat;

identify, based on natural language processing of a threat model associated with a software application, one or more attributes of the software application;

determine, based on a comparison between the one or more attributes of software susceptible to the new security threat and the one or more attributes of the software application, that the software application is susceptible to the new security threat; and in response to determining that the software application is susceptible to the new security threat, update the threat model to reflect the susceptibility of the software application to the known security threat.

16. The non-transitory computer-readable medium of claim 15, wherein determining that the software application is susceptible to the new security threat comprises determining that the one or more attributes of software susceptible to the new security threat match the one or more attributes of the software application.

17. The non-transitory computer-readable medium of claim 15, wherein determining that the software application is susceptible to the new security threat comprises:

determining a similarity score between the one or more attributes of software susceptible to the new security threat and the one or more attributes of the software application; and determining that the similarity score is greater than a threshold.

18. The non-transitory computer-readable medium of claim 17, wherein determining the similarity score comprises applying a machine learning clustering algorithm.

19. The non-transitory computer-readable medium of claim 15, wherein in response to determining that the software application is susceptible to the new security threat, the instructions, when executed by the hardware processor, cause the processor to generate an alert indicating that the software application is susceptible to the known security threat.

20. The non-transitory computer-readable medium of claim 15, wherein the instructions, when executed by the hardware processor, further cause the processor to:

identify, based on natural language processing of a second threat model associated with a second software application, one or more attributes of the second software application; and determine, based on a comparison between the one or more attributes of software susceptible to the new security threat and the one or more attributes of the second software application, that the second software application is not susceptible to the new security threat.

* * * * *